United States Patent [19]
Schroeder et al.

[11] 3,787,239
[45] *Jan. 22, 1974

[54] CHEMICAL STRIPPERS AND METHOD OF USING

[75] Inventors: Kenneth H. Schroeder, Wilmington, Del.; George J. Kelly, Jr., Port Murray, N.J.

[73] Assignee: Allied Chemical Corporation, New York, N.Y.

[ * ] Notice: The portion of the term of this patent subsequent to July 11, 1989, has been disclaimed.

[22] Filed: July 10, 1972

[21] Appl. No.: 270,125

Related U.S. Application Data

[63] Continuation-in-part of Ser. No. 75,660, Sept. 25, 1970, Pat. No. 3,676,219, which is a continuation-in-part of Ser. No. 866,036, Oct. 13, 1969, abandoned.

[52] U.S. Cl............................ 134/2, 96/36, 96/36.2, 117/34, 156/13, 252/79.2, 252/142, 252/146, 134/3
[51] Int. Cl................................................ C23g 1/02
[58] Field of Search ....... 252/142, 146, 79.2; 134/3, 134/2; 96/36, 36.2; 156/13; 117/34

[56] References Cited
UNITED STATES PATENTS

| | | | |
|---|---|---|---|
| 2,127,469 | 8/1938 | Hempel | 252/101 X |
| 2,837,484 | 6/1958 | Sway et al. | 134/3 X |
| 3,423,262 | 1/1969 | Barditch et al. | 156/13 |
| 3,520,683 | 7/1970 | Kerwin | 96/36.2 |
| 3,523,825 | 8/1970 | Callahan et al. | 134/3 X |
| 3,676,219 | 7/1972 | Schroeder et al. | 134/3 |

*Primary Examiner*—Mayer Weinblatt
*Attorney, Agent, or Firm*—Jay P. Friedenson; Michael L. Dunn

[57] ABSTRACT

Strippers for removal of organic films and deposits, such as the polymeric etch resists employed in the manufacture of semiconductors from inorganic surfaces commonly encountered in the electrical and electronic industries, are composed of solutions of chromium trioxide in mixtures of strong nitric and sulfuric acids containing about 2 percent to about 20 percent water.

9 Claims, No Drawings

CHEMICAL STRIPPERS AND METHOD OF USING

This application is a continuation-in-part of application Ser. No. 75660 filed Sept. 25, 1970 now U.S. Pat. No. 3,676,219 which is in turn a continuation-in-part of application Ser. No. 866,036 filed Oct. 13, 1969 now abandoned.

BACKGROUND

Many inorganic materials are presently encountered in the electronics, electrical industries, and electrical research, collectively referred to as electrical arts, as support materials, insulators, conductors and semiconductors. During assembly of these materials it is frequently necessary to coat the materials during processing. Subsequently, the polymeric organic substance must be removed. There is therefore a need for a stripping agent which will remove the organic substance from the large variety of inorganic materials encountered in the electronic and electrical industries without attacking or damaging these inorganic materials. For example, ceramics are frequently encountered in the electrical and electronic industry as insulators, cores, circuit bases and wafers.

Generally these ceramics include insulating ceramics including and generally consisting essentially of metal oxides, complexes of metal oxides, and mixtures thereof including metal oxide and metal oxide complexes such as silicon dioxide, titanium dioxide, kaolinite, magnesium oxide, barium titanate, lead titanate zirconate, aluminum oxide and magnetic ceramics made from metal oxides or metal oxide complexes including the soft magnetic ferrites having the general formula $MOFe_2O_3$ wherein M is a divalent metal ion such as copper, nickel, cobalt iron, zinc, magnesium or manganese and hard magnetic ferrites such as barium ferrite ($BaO·6Fe_2O_3$) and magnetoplumbite ($PbO·6Fe_2O_3$).

Well known ceramics are made from such metal oxides and metal oxide complexes. For example porcelain is manufactured from fused kaolinite ($Al_2O_3·2SiO_2·2H_2O$) and glass is made from silicon dioxide ($SiO_2$) and a mixture of oxides is used to form steatite ($3M_uO·4SiO_2·H_2O$) a ceramic having a high dielectric constant. Ceramics having ultra high dielectric constants are also manufactured from metal oxides or metal oxide complexes or mixtures. For example barium titanate ($BaTiO_3$) is used to manufacture a ceramic having a dielectric constant of about 2,000. Nitrides of silicon and germanium may be used as a base for printed circuits and many chemically uncombined conducting and semiconducting surfaces are encountered in the electrical art comprising elements selected from aluminum, titanium zirconium, chromium, molybdenum, tungsten, nickel, palladium, platinum, copper, silver, gold, silicon, carbon, germamium, tin, lead, zinc and cadmium.

The needed stripping solution must therefore be effective in removing organic coatings from this large variety of different inorganic materials without damaging the inorganic materials.

In the electrical arts the removal of organic deposits layers or films from this large variety of materials without corrosive effects has therefore been a much considered problem. For example there has in recent years developed a challenging utility in the manufacture of semiconductors for electronic purposes. In the manufacture of semiconductors, it is common practice in certain operations to develop desired circuit geometries or patterns onto a silicon or germanium body or a silicon dioxide or other layer thereon during the many processing steps. These geometries are commonly etched into the body or the layer by selective etching using an etch resist patterned to the desired geometry. This is commonly done by coating the semiconductor with a polymeric photoresist (of either the positive or negative acting types that are exposed through a pattern mask to visible or ultraviolet light or other energy source such as an electron beam). The exposed portion of the photoresist film in the case of positive acting resists, or the unexposed portion of the photoresist film in the case of negative acting resists, is dissolved and removed by a developer solvent. The residual photoresist film is usually dried and baked, leaving the desired pattern of polymeric etch resist that will not be attacked by the chemicals doing the desired etching or other operation on the semiconductor surfaces not protected by the polymeric resist. After the desired operation is performed, it becomes necessary to remove the remaining polymeric etch resist.

DESCRIPTION OF THE INVENTION

A group of solutions useful for removing organic polymeric deposits from the above materials have now been discovered. The solutions are suitable for the above-described stripping operations without attacking or damaging the numerous inorganic materials which may be encountered in such stripping operations in the electrical and electronics industry. The stripping solutions of the invention do not cause etching, peeling or other visible degradation of these inorganic materials even after five or ten cycles of coating and removal of etch resist, and do not affect the electrical resistivity or conductivity of the materials. The solutions of the invention comprise sulfuric acid, sufficient nitric acid (0.3% to 80% $HNO_3$) to substantially increase the solubility of chromium trioxide ($CrO_3$), from 0.2% and preferably from 0.3% of $CrO_3$ up to its saturation concentration in the solution at 30° C. Preferably not more than 2% by weight of solution of chromic acid is incorporated into the stripping solution and stripping is very effective and corrosion is minimized when the concentration is below 0.9%. Stripping action is drastically reduced when the concentration of chromic acid falls below 0.2%. The $H_2SO_4$ and $HNO_3$ together constitute at least 75% of the solution and the proportion of water present may vary from about 2% to about 20%, preferably from about 2% to about 16%. Even more effective stripping is obtained when water concentration is below 6% by weight of solution. Substantially larger proportions of water result in substantially lower stripping efficiency.

The stripping capacity of the solutions of the invention increases as the $CrO_3$ content increases, and the preferred solutions are those containing the highest proportions of the $CrO_3$ permissible without causing attack of the inorganic material. With solutions of the invention containing less than 2% of the $CrO_3$, effective stripping is obtained at room temperature (10°–40° C) of coatings that could be effectively stripped by prior art stripping agents only at temperatures of 90°–100° C or above.

$CrO_3$ may be supplied to the subject systems in any convenient form. One convenient form is sold in commerce in crystalline state as the anhydride of chromium acid. $CrO_3$ may also be conveniently supplied to the systems in the form of salts. Illustrative are the chromate salts, such as $Na_2CrO_4 \cdot 10H_2O$, $K_2CrO_4$ and $(NH_4)_2CrO_4$, and the dichromate salts such as $Na_2Cr_2O_7 \cdot 2H_2O$, $K_2Cr_2O_7$ and $(NH_4)_2Cr_2O_7$.

$CrO_3$ solubility peaks at equivalent surfuric acid concentrations of about 85%. Although our preferred compositions have a $CrO_3$ content less than its maximum solubility the equivalent surfuric acid concentration is preferably at least 75%. Equivalent sulfuric acid concentration or as used herein anhydrous sulfuric acid concentration equals $$\%H_2SO_4 \times 100/(\%H_2SO_4 + \%H_2O).$$

The nitric acid concentration has also been found to be critical. Insufficient nitric acid reduces stripping efficiency while excess nitric acid increases corrosion beyond acceptable limits. Generally the nitric acid concentration should be kept below about 15% by weight to avoid corrosive effects and preferably should be at about 5% concentration or lower. Effective stripping solutions with very low corrosive action have been made where the nitric acid concentration is kept below one percent although at least 0.3% by weight of nitric acid is necessary to insure effective stripping action. It is important that corrosive effects be minimized since generally less than 25 Angstrom units of surface thickness can be removed during the stripping operation without creating adverse effects upon the surface.

The compositions of the invention may contain minor quantities of other ingredients so long as they do not interfere with the intended use. Fluorine, chlorine, alkali metals or alkaline earth metals, borates, phosphates or other materials which might affect the silicon bodies or silicon dioxide film must not be present in active concentrations. Depending on the application and upon the specific concentration of $CrO_3$ in the stripping solutions of the invention, alkali metals or other cations introduced in the form of salts may be tolerated if not present in an active concentration. The determination of the concentration at which a given cation or cations are active may be readily determined by routine experimentation. Thus, in a given application, for reasons of economy or convenience it may be desirable to use a sodium salt of chromaic acid up to the point of tolerance. Any make-up $CrO_3$ that may be required could then be added in the form of the acid anhydride or a salt in which the cation is not objectionalbe such as, for example, the ammonium salt. For some purposes, it is preferred to have the solutions substantially completely free of cations such as $Na^+$, $K^+$ and $NH_4^+$ in which case the $CrO_3$ is provided in a form other than a salt. By substantially completely free, it is intended to include only trace amounts of cation impurities which may be introduced with the $H_2SO_4$ and $HNO_3$ components, for example, in the order of 10 ppm and less.

It is to be understood that the weight percent of $CrO_3$ referred to in the specification and claims refers to the $CrO_3$ radical and not the compound which is the source of the chromate ions. Thus, one part of dichromate salt having two chromium atoms has a higher $CrO_3$ equivalency than one part of a chromate salt having only one chromium atom.

In the manufacture of semiconductors from silicon dioxide-coated silicon bodies, metallic aluminum or other metallic films are frequently associated with the silicon dioxide films under such circumstances that strippers harmless to the aluminum or other metal must be used. See, for example, U.S. Pat. No. 3,426,422. As regards corrosiveness to aluminum the strippers of the invention have been found to be the equal of or superior to prior art strippers used for such purposes, when applied at appropriate stripping temperatures.

No particular procedure is required for the manufacture of the solutions of the present invention. Water and then sulfuric acid may be added to nitric acid with agitation and cooling, and then the $CrO_3$ may be added with additional agitation and cooling. A part or all of the water may be present as a constituent of one or both of the acids used, or a nitric acid containing more than the desired amount of water may be employed and oleum used to replace all or part of the sulfuric acid.

The solutions may be employed in conventional manner for removing the coatings, deposits, etc. Thus the article to be cleaned may be washed by immersion, by a flowing stream or stirred body of the solution or by a spray directed against the article. The solutions have the important advantage that they are not only effective at ordinary room temperatures, but they are also effective as elevated temperatures and may be used at such temperatures with attendant increased rate or cleaning. Thus their use at temperatures of 100° C or so provides exceedingly rapid removal of etch resists such as Kodak Metal Etch Resist, usually designated "KMER," a product of Eastman Kodak Company.

In the following examples illustrative embodiments of the invention are prepared and tested. Example 1 illustrates the preparation of the solutions.

EXAMPLE 1

Into a round bottom glass flask fitted with cooling bath, agitator, thermometer, and drying tube, were added 709 parts of 70.54% nitric acid. Then 792 parts of distilled water and 849 parts of 95.56% sulfuric acid were added serially and progressively with agitation and cooling. The temperature was maintained at 20°–30° C. After addition of sulfuric acid was completed to form the solvent, the temperature was lowered to 0°–5° C, at which $CrO_3$ is more soluble therein; and to 1,000 parts of the solvent 68.5 parts of $CrO_3$ (as crystals of chromic acid anhydride) were added. Parts are by weight.

In order to evaluate the solutions of the invention for use in the manufacture of semiconductors, the following test procedure was employed. Silicon wafers, commercially coated with a silicon dioxide film according to practices regularly employed in the semiconductor industry (8,000 Angstrom steam-grown films), were employed as test specimens. An etch resist solution sold commercially for this purpose was applied to the film uniformly by the technique known as spin casting. The composition used in a xylene solution of a prepolymer of the polyisoprene type and a sensitizer or developer for promoting hardening and insolubilizing. It is sold by the Eastman Kodak Company under the trade designation "KMER." The prepolymer is susceptible to curing by exposure to light rays in or near the visible-ultraviolet border; wave lengths of about 315 to 480 millimicrons and especially near the middle of this range; it is thus converted to a protective coating insoluble in xylene. The coated wafers were heated to a temperature of about 100° C for about 30 minutes to evaporate off the solvent. They were then masked with an opaque stencil to shield portions of the coating and were exposed to light rays from a 600 watt Westinghouse "Oxy Movie Flood" lamp at a distance of about 9 inches for about ½ minute to harden the coating and render it insoluble. The wafers were then immersed in and washed with KMER solvent (xylene) to remove the uncured portions of the coating. The wafers were then baked at 160° C. (or at 200° C where so indicated) for 30 minutes to further harden the polymer. Each wafer now possessed on one surface a silicone dioxide film which was partially exposed and partially protected by cured organic polymer.

To test the stripping action of the various stripping solutions, a wafer was immersed in the stripping solution under test at 27°–28° C, except as otherwise indicated, and for the time indicated in the following table. The wafer was then washed by dipping it in water, then subjecting it to a stream of distilled water. The washed wafer was examined visually and microscopically (at 20X) to determine extent of removal of the polymer and condition of the silicon dioxide wafer. The results are tabulated for sixteen examples of various stripping solutions in the following table I.

EXAMPLE 17

A silicon dioxide wafer coated with vapor deposited titanium was coated with a polymeric photoresist coating as in Examples 1 through 16. The coating is then stripped with a solution of 90% $H_2SO_4$, 0.4% $HNO_3$ and 0.5% $CrO_3$ and the balance water, all percentages are by weight of the total solution. The percentage of $H_2SO_4$ is equivalent weight excluding water. All polymeric coating is removed in from 30 to about 90 seconds. The exposure of the wafer to the solution is then continued for about 100 minutes at 25° C to remove the titanium coating having an original thickness of 183 A. The corrosion rate of the surface is then estimated at less than 1.8A units per minute of titanium.

EXAMPLE 18

The procedure of Example 17 is followed except the wafer is coated with 1,000 A units of silicon nitride. The photoresist polymeric coating is stripped in from about 30 to about 90 seconds and after exposure to the solution for 100 minutes less than 250 A of the silicon nitride surface had been removed. The corrosion rate of the silicon nitride surface by the stripping solution is then estimated to be less than about 2.5 A units per minute.

EXAMPLE 19

A tantalum strip was exposed to the stripping solution used in Example 18. After separate samples exposed 90 hours at 69° C, 119 hours at 46° C, and 119 hours at 24° C, the corrosion rate is calculated at less than 0.02 A per minute in each case.

EXAMPLE 20

The procedure of Example 19 is followed except the stripping solution contains 1 percent nitric acid and the metal strip used is an aluminum strip. The corrosion rate for exposure of 45 hours at 25° C is calculated to be less than 0.02 A per minute.

EXAMPLE 21

The procedure of Example 20 is followed except the stripping solution contains 10% by weight nitric acid, 0.5% chromic acid, 80% sulfuric acid and the balance water. The corrosion rate on the aluminum after 45 hours at 25° C is calculated to be about 0.4 A per minute.

EXAMPLE 22

A germanium wafer is coated with a polymeric photoresist coating as in Example 1. The wafer is then exposed to a stripping solution containing 0.3% by weight chromic acid, 0.4% be weight $HNO_3$, 90% equivalent weight $H_2SO_4$ and the balance water. The polymeric coating is removed by the solution after an exposure of about 2 minutes. No corrosion of the germanium surface is detected after the 2 minute exposure.

EXAMPLE 23

A stripping solution containing 0.5% $CrO_3$, 0.6% nitric acid, 90 equivalent percent $H_2SO_4$ and water is prepared, all percentages being by weight of the total solution. A drop of the solution is placed on a surface of each of the following materials: porclain, glass, steatite,

TABLE 1

| Example | Equivalent $H_2SO_4$ percent | Concentration as percent of solvent | | | | Minutes for stripping[2] |
| --- | --- | --- | --- | --- | --- | --- |
| | | $H_2SO_4$ | $HNO_3$ | $H_2O$ | $CrO_3$ | |
| 1 | 85.5 | 81.2 | 5.0 | 13.8 | 6.85 | 0.5 to 1.0 |
| 2[1] | 94.1 | 57.7 | 38.7 | 3.6 | 3.1 | 1.5 − |
| 3 | 73.5 | 44.1 | 40.0 | 15.9 | 0.93 | 1.5 to 4.0 |
| 4 | 73.5 | 44.1 | 40.0 | 15.9 | 0.5 | 1.5 to 4.0 |
| 5 | 79.5 | 47.7 | 40.0 | 12.3 | 3.33 | 1.0 +; 1.5 − |
| 6[1] | 94.3 | 84.0 | 10.8 | 5.2 | 2.04 | 1.5 − |
| 7 | 85.5 | 84.6 | 1.0 | 14.4 | 6.42 | 1.5 +; 4.0 − |
| 8 | 85.5 | 84.6 | 1.0 | 14.4 | 6.42 | 0.08[3] |
| 9 | 85.5 | 84.6 | 1.0 | 14.4 | 0.5 | 1.5 to 4.0 |
| 10 | 94.5 | 93.6 | 1.0 | 5.4 | 2.22 | 1.5 +; 4.0 − |
| 11 | 71.5 | 20.0 | 72.0 | 8.0 | 2.83 | 1.5 − |
| 12 | 97.5 | 87.75 | 10.0 | 2.25 | 4.32 | 0.5 |
| 13 | 97.5 | 96.5 | 1.0 | 2.5 | 0.46 | 1.5 − |
| 14 | 85.5 | 85.1 | 0.5 | 14.4 | 5.61 | 1.5 − |
| 15 | 94.5 | 56.7 | 40.0 | 3.3 | 9.25 | 1.5 − |
| 16 | 79.5 | 71.5 | 10.0 | 18.5 | 1.86 | 4.0 to 10 |

Notes to Table:
[1] Coating postbaked at 200°C for 30 minutes.
[2] The minus signs in this column indicate complete removal in less than the indicated time; the plus signs signify that all but a trace was removed in the indicated time.
[3] Test at the usual 90°–100°C stripping temperature.

barium titanate, barium ferrite, chromium, molybdenum, tungsten, nickel, copper, silver, gold, silicon, tin, lead, and cadmium. After 2 minutes exposure to the drop none of the materials showed evidence of corrosion and etching of the surface on each of the materials was less than 25 Angstrom units of thickness.

EXAMPLE 24

Copper strips were coated with thin films of machine oil, acrylonitrile-butadiene-styrene polymer styrene polymer, paraffin wax, polyurethane and polypropylene. The strips were then immersed in a stripping solution containing 0.5% $CrO_3$, 0.6% nitric acid 90 equivalent percent $H_2SO_4$ and water. All films were removed after 2 minutes.

Prior to the present invention compositions containing nitric, chromic and sulfuric acids have been disclosed for such purposes as cleaning chemical process equipment but these compositions differ fundamentally from those of the present invention in containing higher nitric acid concentrations which increase corrosive effects and, in general containing an essential ingredient increasing the activity of the composition. Such compositions are disclosed in U.S. Pat. Nos. 2,172,171; 2,497,905; 2,904,414; 3,060,071; and 3,523,825. The compositions of these patents are generally unsuitable for the purposes of the present invention since they have neither the stripping efficiency nor the low corrosiveness of the present composition. U.S. Pat. No. 3,523,825 disclosed a composition similar to the present composition but there is no indication that it might have low corrosion effects upon materials encountered in the electrical industries.

All numerically expressed proportions herein set forth are by weight based on total solution unless otherwise indicated.

It is to be understood that the specific details recited in the specification are set forth by way of illustration and not by way of limitation of the invention. For example, as will be obvious to anyone of ordinary skill in this art, various additives may be added to the stripping solutions of the invention without altering the basic properties and characteristics of the stripping solutions. Illustrative are thickeners such as colloidal silica. Hence the scope of the invention is to be limited only by a reasonable interpretation of the following claims.

We claim:

1. A method for removing organic deposits from a surface consisting essentially of at least one insulating, conducting, semiconducting or support material encountered in the electrical arts which material is selected from the group consisting of: insulating ceramics and magnetic ceramics which include metal oxides, complexes of metal oxides and mixtures thereof; silicon nitrides; germanium nitrides; and conductors and semiconductors which comprise an element selected from aluminum, titanium, zirconium, chromium, molybdenum, tungsten, nickel, palladium, platinum, copper, silver, gold, silicon, carbon, germanium, tin, lead, zinc and cadium, comprising stripping said deposits from said surface with a stripping solution comprising water, chromic acid, sulfuric acid and nitric acid, said solution including from about 0.2% to not more than 2% by weight of solution of chromic acid, from about 0.3% to about 15% by weight of solution of nitric acid, from about 2% to about 20% water, the balance of said solution being anyhdrous sulfuric acid, said surface being etched by said solution by less than 25 Angstrom units of thickness of said surface at room temperature in 2 minutes.

2. A method for removing organic deposits from a surface consisting essentially of a ceramic formed from a composition selected from the group consisting of metal oxides, metals oxide complexes and mixtures thereof, said method comprising stripping said deposits from said surface with a stripping solution including from about 0.2% to not more than 2% by weight of solution of chromic acid, from about 0.3% to about 15% by weight of solution of nitric acid, from about 2% to about 20% by weight water the balance of said solution being anyhdrous sulfuric acid, said surface being etched by said solution by less than 25 Angstrom units of thickness of said surface at room temperature in 2 minutes.

3. The method of claim 2 wherein said ceramic surface is formed from a composition selected from the group consisting of silicon dioxide, titanium dioxide, kaolinite, magnesium oxide, barium titanate, lead titanate zirconate, aluminum oxide, barium ferrite, magnetoplumbite and soft magnetic ferrites having the general formula $MOFe_2O_3$ wherein M is a divalent metal ion selected from the group consiting of copper, nickel, cobalt, iron, zinc magnesium or manganese.

4. The method of claim 3 wherein said stripping solution includes from about 0.3% to less than about 0.9% chromic acid, from about 0.3% to about 5% by weight of solution of nitric acid, from about 2% to about 16% water the balance of said solution being anhydrous sulfuric acid.

5. A method for removing organic deposits from a surface comprising a nitride selected from the group consisting of silicon nitride and germanium nitride, said method comprising stripping said deposits from said surface with a stripping solution including from about 0.2% to not more than 2% by weight of solution of chromic acid, from about 0.3% to about 15% by weight of solution of nitric acid, from about 2% to about 20% by weight water, the balance of said solution being anhydrous sulfuric acid.

6. The method of claim 5 wherein said stripping solution contains not more than 0.9% by weight of chromic acid and not more than about 5% by weight of nitric acid.

7. A method for removing organic deposits from a conducting or semiconducting surface comprising an element selected from the group consisting of aluminum, titanium, zirconium, chromium, molybdenum, tungsten, nickel, palladium, platinum, copper, silver, gold, silicon, germanium, tin, lead, zinc, and cadmium comprising stripping said deposits from said surface with a stripping solution including from about 0.2% to not more than 2% by weight of solution of chromic acid, from about 0.3% to about 15% by weight of solution of nitric acid, from about 2% to about 20% by weight water, the balance of said solution being anhydrous sulfuric acid.

8. The method of claim 7 wherein stripping solution contains not more than 0.9% by weight of chromic acid and not more than about 5% by weight of nitric acid.

9. The method of claim 8 wherein the elements are selected from the group consisting of aluminum, titanium, silicon and germanium.

* * * * *

UNITED STATES PATENT OFFICE
CERTIFICATE OF CORRECTION

Patent No. 3,787,239    Dated January 22, 1974

Inventor(s) KENNETH H. SCHROEDER and GEORGE J. KELLY, JR.

It is certified that error appears in the above-identified patent and that said Letters Patent are hereby corrected as shown below:

Col. 3, line 45 - "chromaic" should read -- chromic --;

Col. 3, line 48 - "objectionalbe" should read -- objectionable --;

Col. 4, line 24 - "effective as" should read -- effective at --;

Col. 6, line 33 - "0.4% be" should read -- 0.4% by --;

Col. 6, line 44 - "prclain" should read -- porcelain --;

Col. 7, line 10 - After "polymer" insert -- , --;

Col. 8, line 7 - "metals oxide" should read -- metal oxide --;

Col. 8, line 14 - "anyhdrous" should read -- anhydrous --;

Col. 8, line 52 - "silicon, germanium," should read -- silicon, carbon, germanium, --.

Signed and sealed this 3rd day of December 1974.

(SEAL)
Attest:

McCOY M. GIBSON JR.
Attesting Officer

C. MARSHALL DANN
Commissioner of Patents